United States Patent [19]

Ito

[11] Patent Number: 5,816,495

[45] Date of Patent: Oct. 6, 1998

[54] HEATING APPARATUS FOR VEHICLE

[75] Inventor: Yuji Ito, Ichinomiya, Japan

[73] Assignee: Denso Corporation, Kariya, Japan

[21] Appl. No.: 892,411

[22] Filed: Jul. 14, 1997

[30] Foreign Application Priority Data

Jul. 19, 1996 [JP] Japan .................................. 8-191123

[51] Int. Cl.$^6$ ................................................ B60H 1/02
[52] U.S. Cl. ............................ 237/12.3 R; 237/12.3 B; 122/26; 126/247
[58] Field of Search ......................... 237/12.3 R, 12.3 B, 237/2 A; 122/26; 126/247

[56] References Cited

U.S. PATENT DOCUMENTS 4,993,377  2/1991  Itakura .

FOREIGN PATENT DOCUMENTS

A-6-92134  4/1994  Japan .

Primary Examiner—Henry A. Bennett
Assistant Examiner—Derek S. Boles
Attorney, Agent, or Firm—Harness, Dickey & Pierce, PLC

[57] ABSTRACT

In a heating apparatus according to the present invention, a water valve disposed between a viscous heater and a heater core is controlled by a servomotor to be interlocked with an air mixing damper. An opening degree of the water valve is calculated based on a target damper opening degree of the air mixing damper, and a flow amount of cooling water circulating into a cooling water passage is calculated based on the opening degree of the water valve. When the flow amount of the cooling water is smaller than the set flow amount, an electromagnetic coil of the viscous clutch is turned off. In this way, a rotational driving force is not transmitted from the engine to a shaft of the viscous heater to prevent viscous fluid from being heated abnormally.

11 Claims, 11 Drawing Sheets

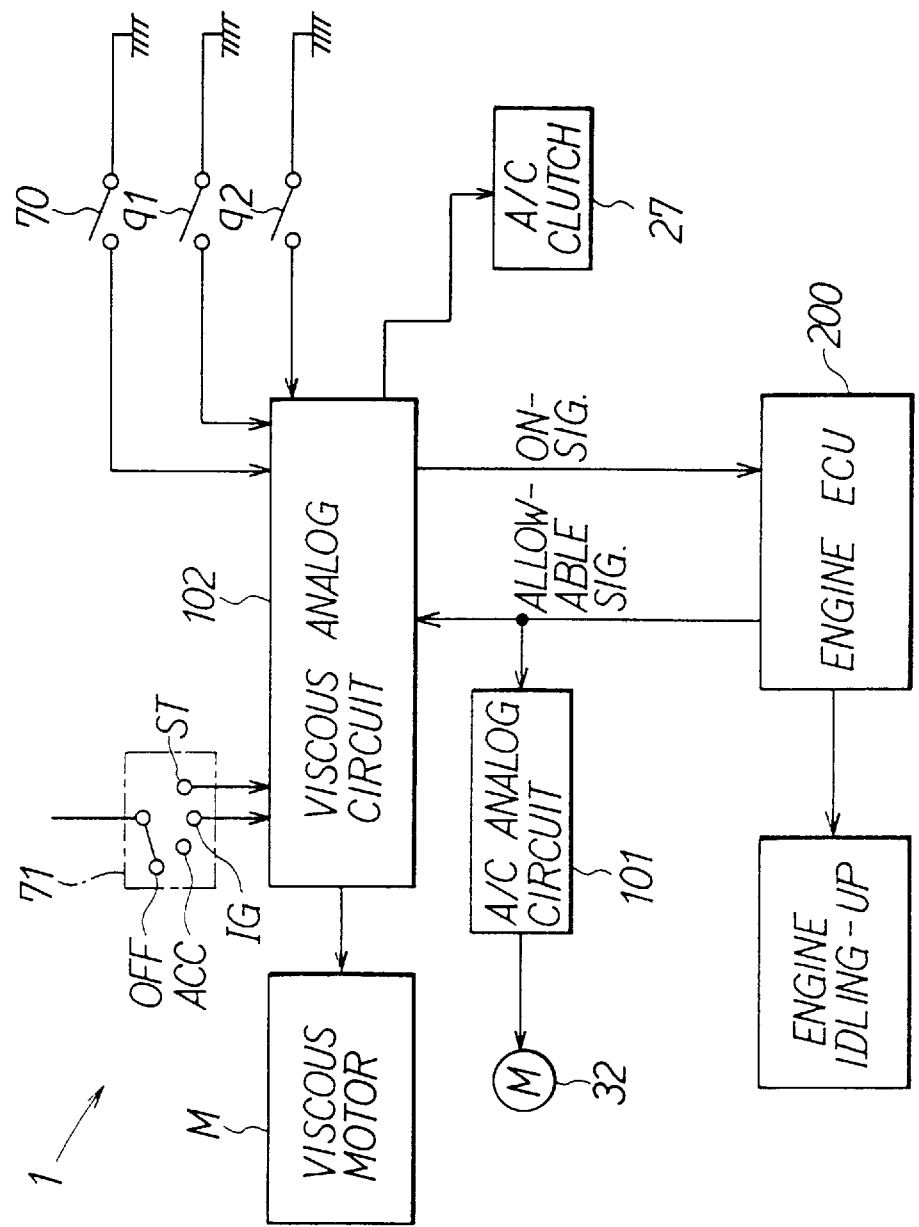

HEATING APPARATUS FOR VEHICLE

CROSS REFERENCE TO THE RELATED APPLICATION

This application is based on and claims priority of Japanese Patent Application of No. Hei. 8-191123 filed on Jul. 19, 1996, the content of which are incorporated herein by reference.

BACKGROUND OF THE INVENTION

1. Field of the Invention

The present invention relates to a heating apparatus for a vehicle, which employs a heat-generating unit using a shearing force, for increasing a temperature of cooling water for cooling a water-cooled engine by generation heat of viscous fluid, as a supplemental heating source for heating.

2. Description of Related Art

Conventionally, as a heating apparatus for a vehicle, a hot water type heating apparatus for heating a passenger compartment has been generally known. In the hot water type heating apparatus, cooling water for cooling a water-cooled engine is supplied to a heater core disposed in a duct, and air heated while passing through the heater core is blown into the passenger compartment by a blower to heat the passenger compartment.

Recently, an improvement of an engine efficiency has been demanded for an engine mounted on a vehicle. However, when the engine efficiency is improved, heat loss decreases; and therefore, the cooling water for cooling the engine cannot be heated sufficiently. Further, in a case of a vehicle having a diesel engine or a lean burn engine, the heat amount generated by the engine is too small to heat the cooling water sufficiently. In the case of the vehicle where the heat amount generated by the engine is small, a temperature of the cooling water in the cooling water circuit cannot be maintained at a predetermined temperature (for example, 80° C.), there occurs a problem in that a heating capacity for the passenger compartment is insufficient.

To overcome such a problem, as disclosed in JP-A-2-246823, there has been conventionally proposed a heating apparatus for a vehicle in which a heat-generating unit using a shearing force, for heating cooling water supplied to a heater core, is disposed in a cooling water circuit.

The heat-generating unit transmits a rotational driving force of the engine to a shaft through a belt transmitting mechanism and the electromagnetic clutch, a heat-generating chamber is formed in a housing, and a cooling water passage is formed at an outer periphery of the heat-generating chamber. Further, a rotor which rotates integrally with the shaft is disposed in the heat-generating chamber, and a shearing force generated by a rotation of the rotor is applied to viscous fluid such as silicon oil sealed in the heat-generating chamber to generate heat. The cooling water is heated by the generated heat.

However, when a water valve for adjusting a radiating amount of the heater core is disposed on the midway of a cooling water pipe for connecting the heat-generating unit and the heater core, if the water valve is closed, the cooling water does not circulate into the cooling water circuit of the heat-generating unit, with the result that there occurs a problem in that the viscous fluid in the heat-generating chamber is heated abnormally.

Especially when high-viscosity silicon oil is used as the viscous fluid, if a temperature of oil itself as a material of the high-viscosity silicon oil is heated abnormally up to 250° C. or more, there is a possibility that a mechanical deterioration or a thermal deterioration due to the shearing force of the rotor generates. Once the mechanical deterioration or a thermal deterioration generates as described above, the viscosity of the viscous fluid lowers. In this way, thereafter, even if the shearing force is applied to the viscous fluid by the rotor, heat-generating efficiency lowers, and there occurs a problem in that sufficient heating capacity cannot be obtained when the heating operation for the passenger compartment is necessary.

SUMMARY OF THE INVENTION

In view of the above-described problems, it is accordingly an object of the present invention to provide a heating apparatus for a vehicle, capable of preventing the viscous fluid from being heated abnormally.

Further, it is another object of the present invention is to provide a heating apparatus for a vehicle, capable of obtaining sufficient heating capacity when the heating operation for the passenger compartment is necessary, by optimizing a used condition of the heat-generating unit.

According to the present invention, a heating apparatus includes a heating heat exchanger for heating a passenger compartment of a vehicle by heat-exchanging between cooling water having cooled a water-cooled engine and air to be blown into the passenger compartment, a heat-generating unit having a rotor which rotates when a rotational driving force of the engine is applied thereto, a heat-generating chamber for sealing therein viscous fluid which generates heat when a shearing force generated by a rotational driving force of the rotor is applied thereto, and a cooling water passage in which the cooling water circulates between the engine and the heating heat exchanger, shearing state switching means for switching a shearing state of the viscous fluid by the rotational driving force of the rotor, and water amount detecting means for detecting an amount of the cooling water circulating in the cooling water passage. When the amount of the cooling water flowing into the heat generating unit detected by the water amount detecting means is less than a predetermined value, a heating control unit controls the shearing state switching means to stop a shearing force applied to the viscous fluid by the rotational driving force of the rotor. Accordingly, a shearing force is not applied from the rotor to the viscous fluid in the heat-generating chamber. Therefore, even if an amount of the cooling water circulating in the cooling passage of the heat-generating unit is smaller than a predetermined flow amount, the viscous fluid is prevented from being heated abnormally. In this way, since the mechanical deterioration or the thermal deterioration of the viscous fluid can be prevented, the viscosity and the heat generating efficiency of the viscous fluid can be prevented from being lowered. Therefore, it is possible to obtain sufficient heating capacity when the heating operation for the passenger compartment is necessary. Further, since the flow amount of the cooling water is small at this time, the necessary heating capacity may be also reduced. Therefore, the heating capacity can be prevented from being deteriorated even if the heat-generating unit is stopped.

BRIEF DESCRIPTION OF THE ACCOMPANYING DRAWINGS

Additional objects and advantages of the present invention will be more readily apparent from the following detailed description of preferred embodiments thereof when taken together with the accompanying drawings in which:

FIG. 14 is a block diagram showing an electric circuit of an air conditioning apparatus for a vehicle according to a sixth embodiment.

DETAILED DESCRIPTION OF THE PREFERRED EMBODIMENTS

Figure 1:
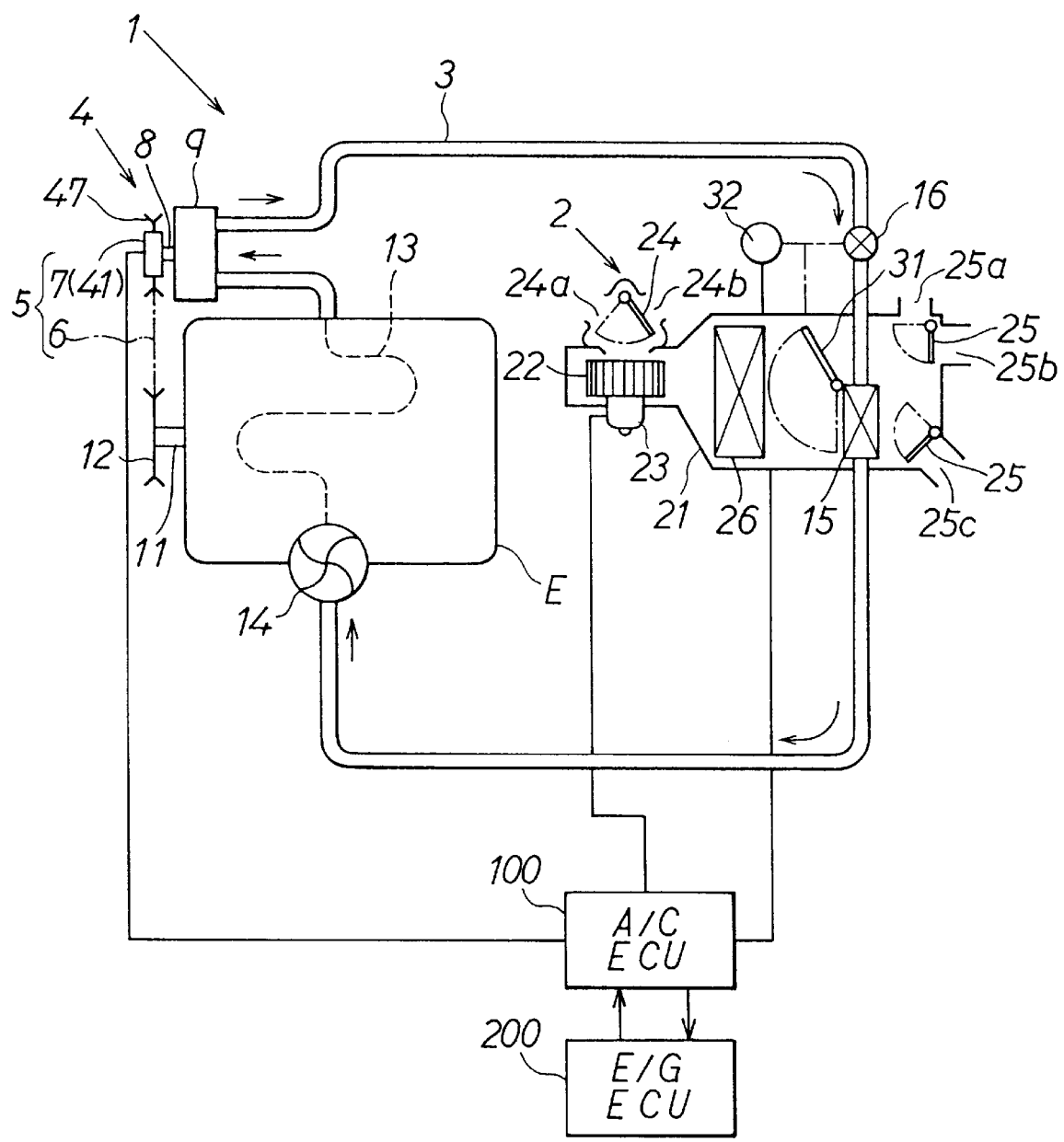
FIG. 1 is a schematic view showing an entire structure of an air conditioning apparatus for a vehicle, according to a first embodiment of the present invention.

A first embodiment of the present invention will now be described with reference to FIGS. 1 to 10.

An air conditioning system 1 for a vehicle is of an air mixing temperature control system and is equipped with a water-cooled diesel engine E (hereinafter referred to as "engine"), an air-conditioning unit (hereinafter referred to as A/C unit) 2 for air-conditioning a passenger compartment, a cooling water circuit 3 for using cooling water having cooled the engine E as heating source for heating, a heat-generating unit 4 using a shearing force, for heating cooling water for cooling the engine E, an air conditioning ECU (hereinafter referred to as A/C ECU) 100 for controlling the A/C unit 2, an engine ECU 200 for controlling the engine E, and the like.

The engine E is disposed in an engine compartment and rotates the heat-generating unit 4. To an output shaft (crankshaft) 11 of the engine E, there is attached a crank pulley 12 connected to a V-belt 6 (described later). The engine E is provided with a water jacket around a cylinder block and a cylinder head. The water jacket 13 is disposed in the cooling water circuit 3 through which the cooling water circulates.

In the cooling water circuit 3, there is disposed a water pump 14 for compulsorily pumping the cooling water, a radiator (not shown) for cooling the cooling water by heat-exchanging the cooling water and air, a heater core 15 for heating air by heat-exchanging the cooling water and air, a water valve 16 for controlling a supply and an interruption of the cooling water into the heater core 15, and the like. The water pump 14 is disposed at an upstream side of the water jacket 13 of the engine E and is rotated by the output shaft 11 of the engine E.

Figure 7:
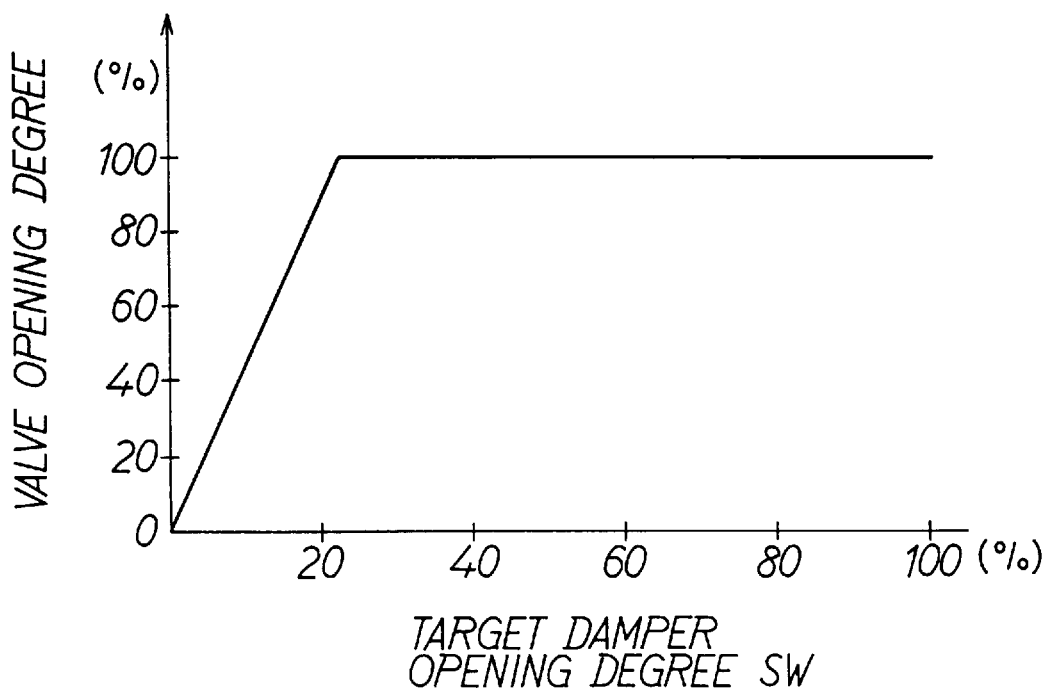
FIG. 7 is a characteristic graph showing a relationship between a target damper opening degree SW and a valve opening degree in the first embodiment.

The water valve 16 is a hot water valve for adjusting an opening degree of a cooling water pipe for supplying cooling water to the heater core 15 according to a target damper opening degree SW of the an mixing damper 31 (described later) as shown in a characteristic graph of FIG. 7. The water valve 16 is connected to a servomotor 32 of the air mixing damper 31 through one or plural link plate(s) to operate with the air mixing damper 31.

The A/C unit 2 is constructed by a duct 21, a blower 22, a refrigeration cycle, a heater core 15, and the like. At an upwind side of the duct 21, there is rotatably provided an inside air/outside air switching damper 24 for selectively opening and closing an outside air inlet 24a and an inside air inlet 24b to switch an air inlet mode. At an downwind side of the duct 21, there is rotatably provided a mode switching damper 24 for selectively opening and closing a defroster air outlet 25a, a defroster air outlet 25b and a foot air outlet 25c to switch an air outlet mode.

The blower 22 is rotated by a blower motor 23 to generate an air flow toward the passenger compartment in the duct 21.

The refrigeration cycle is composed of a compressor (refrigerant compressor), a condenser (refrigerant condenser), a receiver (gas-liquid separator), an expansion valve (decompressing device), an evaporator (refrigerant evaporator), a refrigerant pipe for circularly connecting these components, and the like.

The compressor is equipped with an electromagnetic clutch (hereinafter referred to as "A/C clutch") 27, and compresses refrigerant sucked from the evaporator 26 and discharges the compressed refrigerant toward the condenser. The clutch 27 is connected to a crank pulley 12 (see FIG. 2) attached to the output shaft 11 of the engine E through the V-belt 6. When an electromagnetic coil of the clutch 27 is electrified, an output portion (armature, inner hub) is attracted to an input portion (rotor) so that a rotational power is transmitted to the compressor. The evaporator 26 is disposed in the duct 21 to cool air flowing therethrough.

The heater core 15 is disposed within the duct 21 at a downstream side (upwind side) of the evaporator 26 with reference to the air flow direction and is connected to the cooling water circuit 3 at a downstream side of the heat-generating unit 4 with reference to the flow direction of the cooling water. The heater core 15 heats air by heat-exchanging the air having passed through the evaporator 26 and the cooling water.

At an upwind side of the heater core 15, there is rotatably provided an air-mixing damper 31. The air-mixing damper 31 adjusts a ratio between an amount of air (warm air) passing through the heater core 15 and an amount of air (cool air) bypassing the heater core 15 so that a temperature of air blown out into the passenger compartment can be adjusted. The air mixing damper 31 is actuated by an actuator such as a servomotor 32 through one or plural link plate(s).

Figure 3:
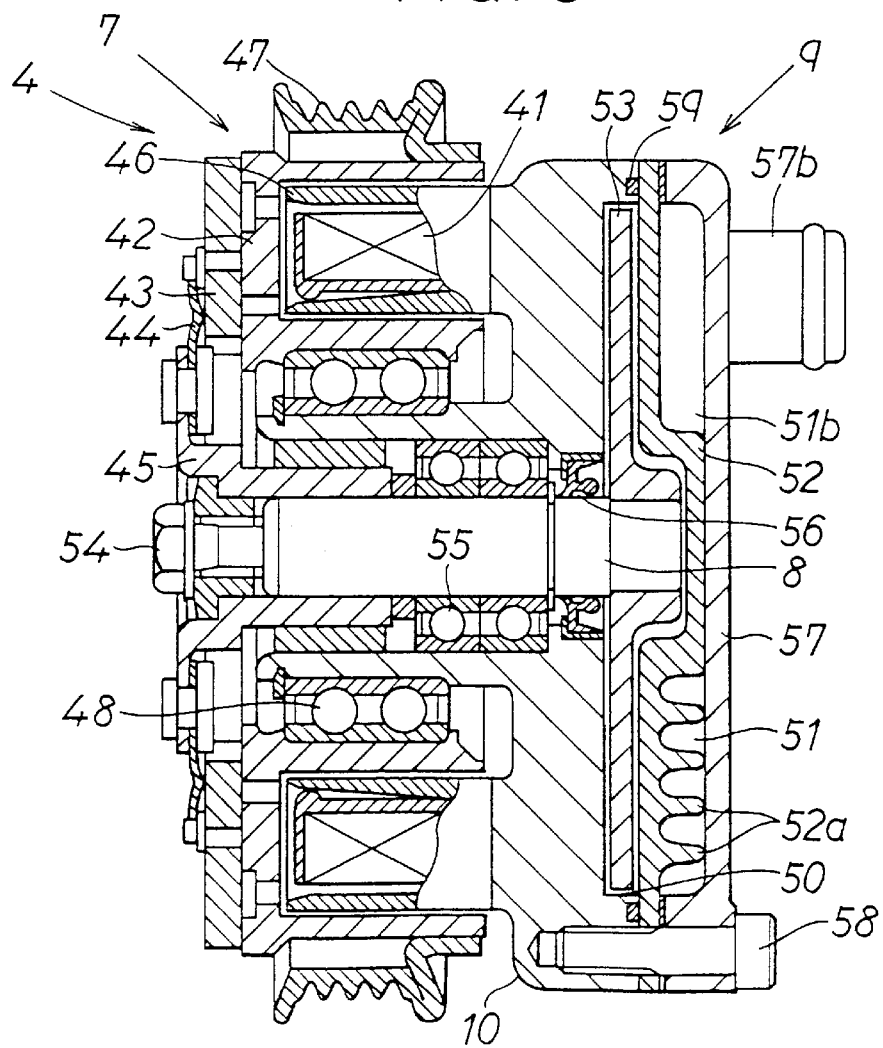
FIG. 3 is a cross sectional view showing a viscous clutch and a viscous heater in the first embodiment.
Figure 4:
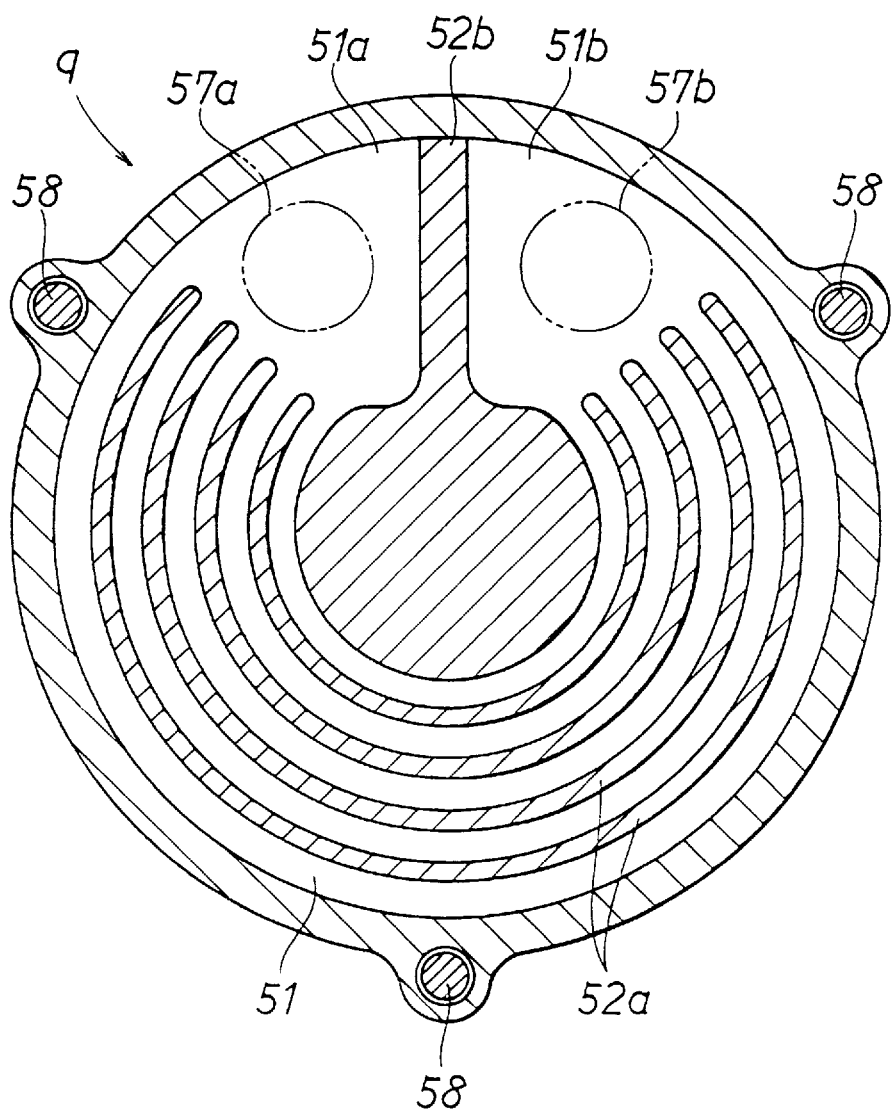
FIG. 4 is a cross sectional view showing the viscous heater in the first embodiment.

Next, the heat-generating unit 4 will be described briefly with reference to FIGS. 1–4. FIGS. 3 and 4 show the heat-generating unit 4.

The heat-generating unit 4 is composed of a belt transmitting mechanism 5 connected to and driven by the output shaft 11 of the engine E, and a heat-generating device 9 (hereinafter referred to as "viscous heater") having a shaft 8.

Figure 2:
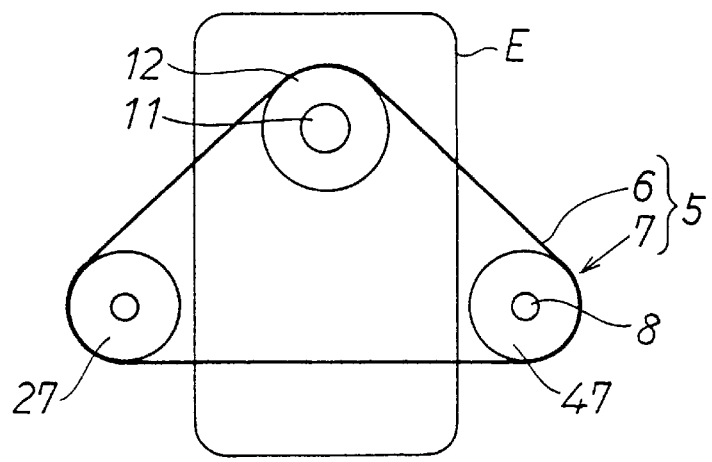
FIG. 2 is a schematic view showing an engine and a belt transmission mechanism in the first embodiment.

The belt transmitting mechanism 5 includes, as shown in FIGS. 1 and 2, a multi-stage type belt hung on the crank pulley attached to the output shaft 11, and an electromagnetic clutch 7 (hereinafter referred to as "viscous clutch") connected to and driven by the output shaft 11 (crank pulley 12).

The V-belt 6 transmits a rotational force (driving force) of the engine E to a shaft 8 of the viscous heater 9 through the viscous clutch 7. In this embodiment, the V-belt 6 is hung on the clutch 27 and the viscous clutch 7.

The viscous clutch 7 intermits a transmission of the rotational force from the output shaft 11 of the engine E to the shaft 8 of the viscous heater 9. The viscous clutch 7 is, as shown in FIG. 3, constructed by an electromagnetic coil 41 for generating a magnetomotive force when being electrified, a rotor 42 rotated by the engine E, an armature 43 attracted toward the rotor 42 by the magnetomotive force, an inner hub 45 connected to the armature 43 with a plate spring 44 and supplying a rotational force to the shaft 8 of the viscous heater 9, and the like.

The electromagnetic coil 41 is structured by winding a conductive lead wire covered with an insulating material. The electromagnetic coil 41 is disposed in the stator 46 and is fixedly molded in the stator 46 with an epoxy resin. The stator 46 is fixed on a front surface of the viscous heater 9.

A V-pulley 47 hanging the V-belt 6 on a periphery thereof is joined to the rotor 42 by joining means such as welding and is a rotating body (input portion of the viscous clutch 7) which always rotates by a rotational force of the engine E, transmitted thereto through the V-belt 6. The rotor 42 is formed of magnetic material to have a U-shaped cross section and is rotatably supported on an outer periphery of a housing 10 of the viscous heater 9 with a bearing 48 disposed at an inner periphery side.

The armature 43 has a friction surface formed in a ring-shaped plate, which is opposed to a friction surface of the rotor 42, formed in a ring-shaped plate, by an air gap (e.g., a clearance of 0.5 mm) in an axial direction therebetween. The armature 43 is formed in a disc-shape by using magnetic material such as iron. When the armature 43 is attracted to the friction surface of the rotor 42 by the electromotive force of the electromagnetic coil 41, the rotational force of the engine E is transmitted from the rotor 42 to the armature 43.

The plate spring 44 is fixed to the armature 43 at an outer peripheral side by fixing means such as a rivet and is fixed to the inner hub 45 at an inner peripheral side by fixing means such as a rivet. The plate spring 44 is an elastic member for displacing the armature 43 in a direction (the left direction in the drawing) as to be separated (released) from the friction surface of the rotor 42 when the supply of the electric current to the electromagnetic coil 41 is stopped, to return the armature 43 to an initial position thereof.

The inner hub 45 is an output portion of the viscous clutch 7 such that the input side thereof is connected to and driven by the armature 43 through the plate spring 44 and the output side is connected to and driven by the shaft 8 of the viscous heater 9 with a spline fitting connection.

The viscous heater 9 is a supplementary heating source of the engine E which is the main heating source, and is constructed by a shaft rotated by the engine E through the V-belt 6 and the viscous clutch 7, a housing 10 for rotatably supporting the shaft 8, a separator 52 for dividing an inner space of the housing 10 into a heat-generating chamber 50 and a cooling water passage 51, a rotor 53 rotatably disposed in the housing 10, and the like.

The shaft 8 is an input shaft which is fixedly fastened to the inner hub 45 of the viscous clutch 7 by fastening means such as a bolt and rotates integrally with the armature 43. The shaft 8 is rotatably disposed in an inner periphery of the housing 10 with a bearing 55 and a sealing member 56. The sealing member 56 employs an oil-seal for preventing a leakage of the viscous fluid.

The housing 10 is made of a metallic member such as aluminum alloy. A cover 57 formed in a ring-shaped plate is fixedly fastened to a rear end of the housing 10 by fastening means 58 such as a bolt and a nut. On a surface where the housing 10 and the cover 57 are joined, there are disposed the separator 52 and a sealing member 59. The sealing member 59 employs an oil-seal for preventing a leakage of the cooling water.

The separator 52 is a partition member which is made of a metallic member such as aluminum alloy, which is superior in heat conductivity. An outer peripheral portion of the separator 52 is sandwiched between a cylindrical portion and a cylindrical portion of the cover 57. Between a front end surface of a partition wall 52b and a rear end surface of the housing 10, there is formed the heat-generating chamber for sealing viscous fluid (e.g., silicon oil) which generates heat when a shearing force is applied thereto.

Between a rear end surface and the cover 57, there is formed the cooling water passage 51, which are liquid-tightly partitioned from the outside and in which the cooling water for cooling the engine E circulates. Further, on the rear end surface of the separator 52 at a lower side, there are integrally formed a plurality of fin portions 52a having a substantially arcuate shape, for transmitting heat of the viscous fluid to the cooling water efficiently.

Instead of the fin portions 52a, the rear end surface of the separator 52 may be formed in a convex and concave shape, or a heat transmission facilitating member such as a corrugated fin and a fine pin fin may be provided on an outer wall surface of the cover 57. Further, between the separator 52 and the rotor 53, there may be formed a labyrinth seal as the heat-generating chamber 50.

The partition wall 52b for partitioning an upstream side water passage 51a and a downstream side water passage 51b are formed to protrude from the rear end surface of the separator 52. To an outer wall portion of the cover 57, which is adjacent to the partition wall 52b, there are connected an inlet side cooling water pipe 57a into which the cooling water flows and an outlet side cooling water pipe 57b through which the cooling water flows out.

The rotor 53 is rotatably disposed in the heat-generating chamber 50 and is fixed to an outer periphery of the rear end portion of the shaft. On an outer peripheral surface or both side wall surfaces of the rotor 53, there are formed a plurality of groove portions (not shown). Between the adjacent groove portions, there is formed a protrusion portion. When the rotational force of the engine E is supplied to the shaft 8, the rotor 53 rotates integrally with the shaft 8 to generate a shearing force to the viscous fluid sealed in the heat-generating chamber 50.

Figure 5:
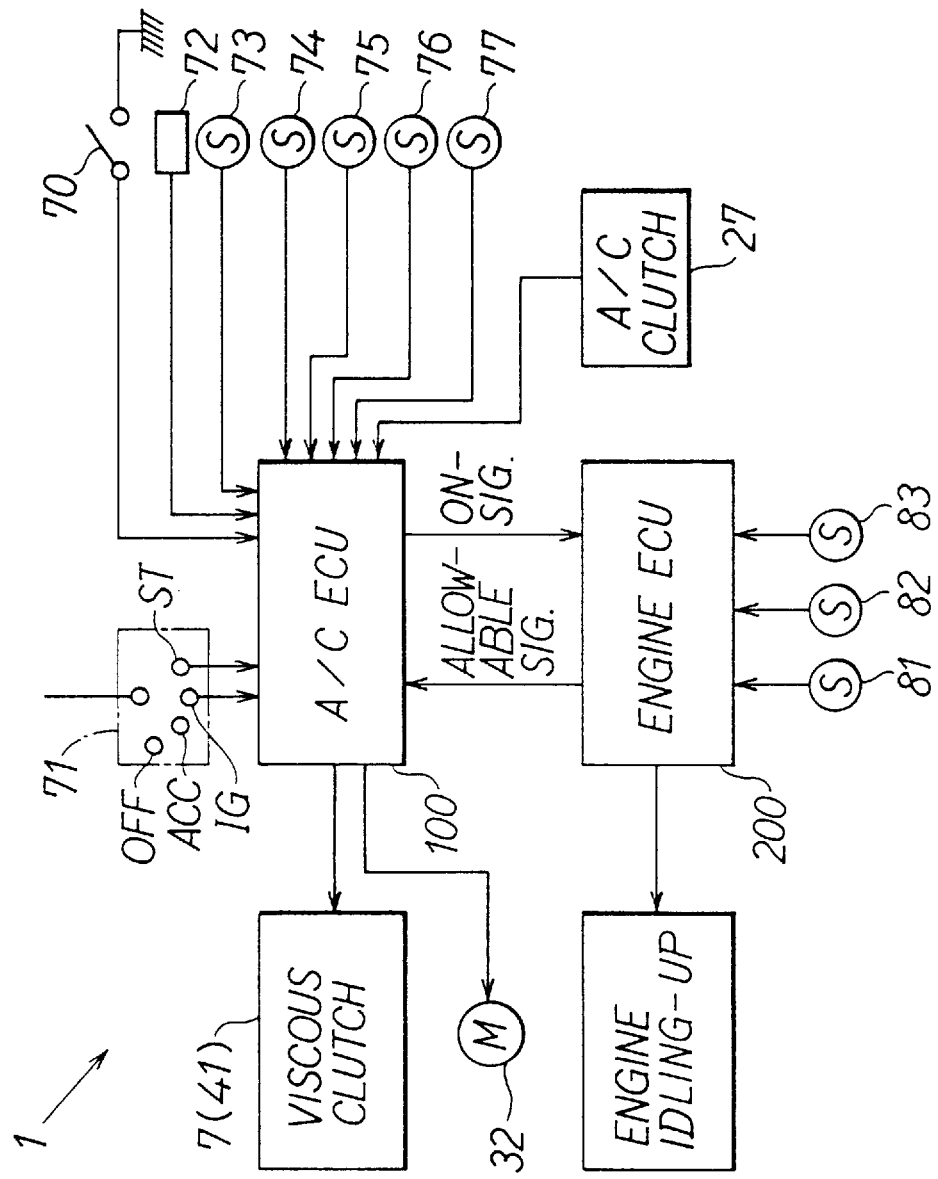
FIG. 5 is a block diagram showing an electric circuit of the air conditioning apparatus for a vehicle in the first embodiment.

Next, the A/C ECU 100 will be described briefly with reference to FIGS. 1, and 5–8. FIG. 5 shows an electric circuit of the system 1.

The A/C ECU 100 is an electric circuit for performing a computer control for cooling and heating equipment of the compressor of the A/C unit 2, the viscous heater 9, and the like. The A/C ECU 100 is a microcomputer in which a CPU, a ROM, and a RAM are incorporated.

The A/C ECU 100 performs an air-conditioning control for the passenger compartment by controlling an cooling and heating equipment including the electromagnetic coil 41 of the viscous clutch 7, a servomotor 32 of the air mixing damper 31, an electromagnetic coil of the A/C clutch 27, and the like, based on input signals from a viscous switch 70, an ignition switch 71, a temperature setting unit 72, an inside air temperature sensor 73, an outside air temperature sensor 74, a sunlight sensor 75, a cooling water temperature sensor 76, a post-evaporator temperature sensor 77, an air-conditioning clutch relay 79 and the engine ECU 200, a pre-stored control program (see FIG. 6), and the like.

A viscous switch 70 is for preferring a heating operation for the passenger compartment by using the viscous heater 9. When the viscous switch 70 is set on, a heating preference signal is output to the A/C ECU 100.

The viscous switch 70 is an economical fuel consumption preference switch for giving a priority on an improvement of the fuel consumption rate (fuel economy). When the viscous switch 70 is set on, a fuel consumption preference signal is output to the A/C ECU 100.

The ignition switch 71 includes each terminal of OFF, ACC, ST and IG. The terminal of OFF is a stator operating switch for outputting a signal to supply an electric current to a starter to the air-conditioning ECU 100.

The temperature setting unit 72 sets a temperature of the passenger compartment for a desired temperature and outputs a set temperature signal to the air-conditioning ECU 100.

The inside air temperature 73 employs a thermistor, for example, to detect a temperature of air in the passenger compartment (inside air temperature), and outputs an inside air temperature detection signal to the A/C ECU 100.

The outside air temperature 74 employs a thermistor, for example, to detect a temperature of air outside the passenger compartment of the vehicle (outside air temperature), and outputs an outside air temperature detection signal to the A/C ECU 100.

The sunlight sensor 75 employs, a photo-diode, for example, to detect an amount of sunlight entering the passenger compartment, and outputs a sunlight detection signal to the A/C ECU 100.

The cooling water temperature 76 employs a thermistor, for example, to detect a temperature of the cooling water in the cooling water circuit W (in this embodiment, a temperature of the cooling water in the outlet side cooling water pipe 57b of the cooling water passage 51 of the viscous heater 9). The outside air temperature 73 outputs a cooling water temperature detection signal to the A/C ECU 100.

The post-evaporator temperature sensor 77 employs a thermistor, for example, to detect a temperature of air blown out from the evaporator 28 (post-evaporator temperature) and outputs a post-evaporator temperature signal to the A/C ECU 100. Further, as means for detecting environmental conditions, in addition to the above-described the inside air temperature sensor 73, the outside air temperature sensor 74, the sunlight sensor 75, the cooling water temperature sensor 76, the post-evaporator temperature sensor 77, there may be additionally employed an outlet air temperature sensor disposed in either one of air outlets of the duct 21, for detecting a temperature of air blown out into the passenger compartment.

Figure 6:
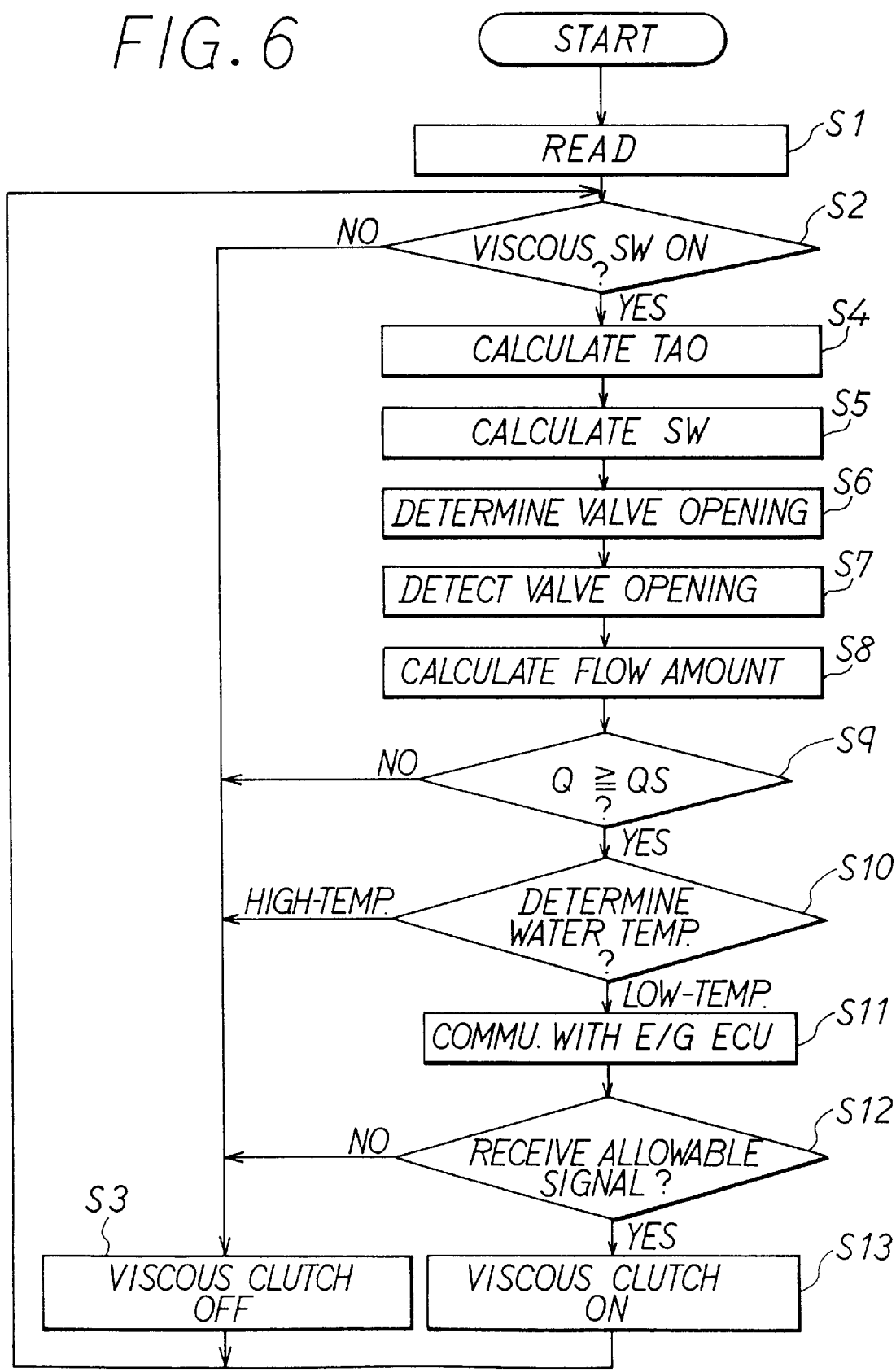
FIG. 6 is a flow chart showing a control program of an air conditioning ECU in the first embodiment.

Next, a control of the viscous heater 9 of the air-conditioning ECU 100 will be described with reference to FIGS. 1–7. FIG. 6 shows a flow chart of a control program of the A/C ECU 100.

Firstly, various kinds of sensor signals and switch signals are input at step S1.

Next, it is determined whether or not the viscous switch 70 is set on, i.e., whether or not the heating preference signal or the economical fuel consumption preference switch is input at step S2. When the determination is "NO", it is not necessary to heat the passenger compartment and a priority is given on the improvement of the fuel consumption rate of the engine E. Therefore, the electromagnetic coil 41 of viscous clutch 7 is turned off, i.e., the supply of the electric current to the electromagnetic coil 41 is stopped, and the rotor 53 of the viscous heater 9 is stopped rotating at step S3. Next, it proceeds to the process at step S1.

When the determination at Step S2 is "YES", a target air temperature TAO of the air to be blown into the passenger compartment is calculated based on the following formula (1) pre-stored in a memory circuit (e.g., the ROM) at Step S4.

$$TAO = Kset \times Tset - Kr \times Tr - Kam \times Tam - Ks \times Ts + C \qquad (1)$$

wherein, Kset is a temperature setting gain, Tset is a set temperature set by the temperature setting unit 72, Tr is an inside air temperature, detected by the inside air temperature sensor 73, Kam is an outside air gain, Tam is an outside air temperature, detected by the outside air temperature 74, Ks is a sunlight gain, Ts is an amount of sunlight, detected by the sunlight sensor 75, and C is a correction constant.

Next, a target damper opening degree SW is calculated based on the following formula (2) pre-stored in a memory circuit (e.g., the ROM) at Step S5.

$$SW = [(TAO - TE)/(TW - TE)] \times 100(\%) \qquad (2)$$

wherein, TAO is the target air temperature calculated at Step S4, Te is the post-evaporator temperature detected by the post-evaporator temperature sensor 77, and Tw is the cooling water temperature detected by the cooling water temperature sensor 76.

Next, an opening degree of the water valve 16 is determined according to a characteristic graph (FIG. 7) of the water valve control based on the target damper opening degree SW, which is pre-stored in a memory circuit (e.g., the ROM), at Step S6. Here, the present opening degree of the water valve 16 which operates with the air mixing damper 31 may be determined based on an output value of a potentiometer for directly detecting the present opening degree of the air mixing damper 31 or an output value to the servomotor 32.

Next, an opening degree of the water valve 16 determined at Step S6 is detected at Step S7.

Then, at Step S8, the flow amount Q of cooling water circulating in the cooling water passage 51 is calculated according to the opening degree of the water valve 16 detected at Step S7.

Next, it is determined whether or not the flow amount Q of the cooling water calculated at Step S8 is higher than a set flow amount QS at Step S9. When the determination is "NO", it proceeds to the process at Step S3, and the electromagnetic coil 41 of the viscous clutch 7 is turned off. The set flow amount QS is set to a circulation flow amount (e.g., 4 liter/min.) when the opening degree of the air mixing damper 31 is set to a set damper opening degree (e.g., 15%) and the opening degree of the water valve 16 is set to a set valve opening degree (e.g., 70–80%).

When the determination at Step S9 is "NO", it proceeds to the process at Step S3, and the electromagnetic coil 41 of the viscous clutch 7 is turned off.

When the determination at Step S9 is "YES", it proceeds to the process at Step S3, and the electromagnetic coil 41 of the viscous clutch 7 is turned off.

Further, when the determination at Step S9 is "YES", it is determined whether the electromagnetic coil 41 of the viscous clutch 7 is set on or off according to a characteristic graph of the viscous heater control (see FIG. 8) based on the cooling water temperature pre-stored in a memory circuit (e.g., ROM). That is, it is determined whether or not the cooling water temperature detected by the cooling water temperature sensor 72 is higher than the set cooling water temperature (the set value) at step S10.

Figure 8:
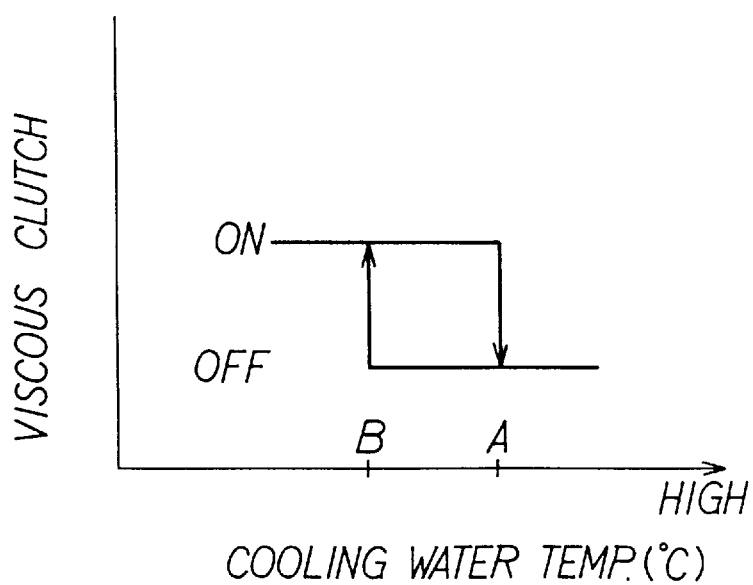
FIG. 8 is a characteristic graph showing a control of the viscous heater based on a temperature of the cooling water and a valve opening degree, executed by an air conditioning ECU, in the first embodiment.

More specifically, as shown in the characteristics graph of FIG. 8, a hysteresis is given between the first set cooling water temperature A (e.g., 80° C.) and the second set cooling water temperature B (e.g., 70° C.). When the cooling water temperature is higher than the set cooling water temperature, the electromagnetic coil 41 is set off, whereas when the cooling water temperature is lower than the set cooling water temperature, the electromagnetic coil 41 is set on. The hysteresis is given to the characteristics graph of FIG. 8; however, the hysteresis may not be given.

When the cooling water temperature is higher than the set cooling water temperature at step S7, it proceeds to the step S3, and the electromagnetic coil 41 of the viscous clutch 7 is set off.

Further, when the cooling water temperature is lower than the set cooling water temperature, it performs a communication with (transmits a signal to and receives a signal from) the engine ECU 200 at Step S11.

Next, it is determined whether an allowable signal for allowing the electromagnetic coil 41 of the viscous clutch 7 to be turned on is received from the engine ECU 200 at Step S12. When the determination is "NO", it proceeds to the process at Step S3, and the electromagnetic coil 41 of the viscous clutch 7 is turned off.

When the determination is "YES" at Step S12, to compensate an insufficient heating capacity in the maximum heating operation, the electromagnetic coil 41 of the viscous clutch 7 is turned on. That is, an electric current is supplied to the electromagnetic coil 41 of the viscous clutch 7 so that the viscous heater 9 operates at Step S13. Next, it proceeds to the process at Step S1.

Next, the engine ECU 200 will be briefly described with reference to FIGS. 1–5.

The engine ECU 200 for an engine control system is an electric circuit for performing a computer control of the engine E. The engine ECU 200 is a microcomputer in which a CPU, a ROM, and a RAM are incorporated.

The engine ECU 200 controls an idling rotational speed of the engine E (idle-up), a fuel injection amount, a fuel injection timing, an intake air throttle, a supply of electric current to a glow plug, and the like, based on signals input from an engine rotational speed sensor 81, a vehicle speed sensor 82, a throttle opening sensor 83, and the A/C ECU 100 and the pre-stored control program. The engine ECU 200 also transmits signals required for processes of the A/C ECU 100 thereto.

The engine rotational speed sensor 81 detects a rotational speed of the output shaft 11 of the engine E and outputs an engine rotational speed signal to the engine ECU 200.

The vehicle speed sensor 82 employs, for example, a reed switch type vehicle speed sensor, a photo-electric switch type speed sensor, or a MRE (Magnetic Resistance Element) type vehicle sensor to detect a speed of the vehicle, and outputs a vehicle speed signal to the engine ECU 200.

The throttle opening sensor 83 detects an opening degree of the throttle valve disposed in an intake pipe of the engine E and outputs a throttle opening signal to the engine ECU 200.

Next, a viscous heater control of the engine ECU 200 will be briefly described with reference to FIGS. 1–5.

The engine ECU 200 firstly reads various kinds of sensor signals from the engine rotational speed sensor 81, the vehicle speed sensor 82, the throttle opening sensor 83, and the like.

The engine ECU 200 determines whether an allowable signal for allowing the electromagnetic clutch 41 of the viscous clutch 7 to be turned on or an unallowable signal for not allowing the electromagnetic clutch 41 of the viscous clutch 7 to be turned on is transmitted to the A/C ECU 100. When it is determined that the allowable signal is transmitted, an amount of intake air is increased so that an idling rotational speed is increased stepwise, i.e., a so-called idle-up control is performed.

Next, an operation of the air conditioning system 1 according to the first embodiment will be briefly described with reference to FIGS. 1–8.

When the engine E starts, the output shaft 11 rotates, and the rotational force of the engine E is transmitted to the rotor 42 through the V-belt 6 of the belt transmitting mechanism 5; however, at least the water valve 16 is not opened. When the flow amount Q of the cooling water circulating into the cooling water passage 51 of the viscous heater 9 is smaller than the set flow amount QS (e.g., 4 liter/min.), the electromagnetic coil 41 of the viscous clutch 7 is turned off. That is, since the electromagnetic coil 41 is turned off, the armature 43 is not attracted toward the friction surface of the rotor 42. Accordingly, the rotational force of the engine E is not transmitted to the inner hub 45 and the shaft 8.

In this way, since the shaft 8 and the rotor 53 do not rotate, a shearing force is not applied to the viscous fluid in the heat-generating chamber 50, and the viscous fluid does not generate heat. Therefore, even if the cooling water heated in the water jacket 13 of the engine E flows through the cooling water passage 51 of the viscous heater 9, the cooling water is supplied to the front heater core 23 without being heated. Therefore, the heating operation of the passenger compartment is started with a small heating capacity.

When the viscous switch 70 is set on, the water valve 16 is opened. In a case where the flow amount Q of the cooling water circulating in the cooling water passage 51 of the viscous heater 9 is larger than the set flow amount QS (e.g., 4 liter/min.), the temperature of the cooling water is lower than the set cooling water temperature (set value), and the allowable signal is received from the engine ECU 3, the electromagnetic coil 41 of the viscous clutch 7 is turned on. That is, since the electromagnetic coil 41 is turned on, the armature 43 is attracted to the friction surface of the rotor 42 with magnetomotive force of the electromagnetic coil 41 to transmit the rotational force of the engine E to the inner hub 45 and the shaft 8.

In this way, since the rotor 53 rotates integrally with the shaft 8, a shearing force is applied to the viscous fluid in the heat-generating chamber 50 to generate heat. Therefore, when the cooling water heated in the water jacket 13 of the engine E passes through the cooling water passage 51, the cooling water is heated while absorbing heat generated by the viscous fluid through the fin portion 52a. The cooling water heated by the viscous heater 9 is supplied to the heater core 15 so that the heating operation of the passenger compartment is performed with a large heating capacity.

The heating capacity of the viscous heater 9 may be set freely in advance by a viscous coefficient of the viscous fluid sealed in the heat-generating chamber 50. That is, the larger viscous coefficient the viscous fluid has, the larger the applying shearing force by the rotation of the rotor 53 becomes. Therefore, the heat-generating capacity of the rotor is increased, and the load and the fuel consumption rate of the engine E rise. on the other hand, the smaller viscous coefficient the viscous fluid has, the smaller the applying shearing force by the rotation of the rotor 53 becomes. Therefore, the heat-generating capacity of the rotor is decreased, and the load and the fuel consumption rate of the engine E lower.

As described above, according to this embodiment, when the flow amount Q of the cooling water circulating in the cooling water passage 51 of the viscous heater 9 is more than the set flow amount QS (e.g., 4 liter/min.), the electromagnetic coil 41 of the viscous clutch 7 is turned on; and therefore, the rotational force of the engine E is transmitted to the viscous heater 9 through the belt transmitting mechanism 5 and the viscous clutch 7. In this way, the viscous heater 9 so that the cooling water circulating the cooling water passage 51 of the viscous heater 9 while absorbing the generated heat of the viscous fluid is supplied to the heater core 15.

Accordingly, the temperature of the cooling water flowing into the heater core 15 increases so that the temperature of the cooling water circuit 3 can be maintained approximately at a predetermined cooling water temperature (e.g., 80° C.). Therefore, the radiating amount of the heater core 15 is increased, and the air sufficiently heated while passing through the heater core 15 is blown into the passenger compartment to prevent the deterioration of the heating capacity for the passenger compartment.

In this embodiment, when the opening degree of the water valve 16 is larger than the set valve opening degree (e.g., 70–80%) (if the heating operation for the passenger compartment is necessary) and the flow amount Q of the cooling water circulating in the cooling water passage 51 of the viscous heater core 9 is smaller than the set flow amount QS (e.g., 4 liter/min.), the electromagnetic coil 41 of the viscous clutch 7 is turned off, and the rotational force of the engine E is not transmitted to the rotor 53. Accordingly, even if the high-viscosity silicon oil is employed as the viscous fluid in the heat-generating chamber 50, the shearing force is not applied from the rotor 53 to the viscous fluid. Therefore, it is prevented that the viscous fluid is heated abnormally higher than 250° C. In this way, since the mechanical deterioration or the thermal deterioration of the viscous fluid can be prevented, the viscosity and the heat generating efficiency of the viscous fluid can be prevented from being lowered. Therefore, it is possible to obtain sufficient heating capacity when the heating operation for the passenger compartment is necessary.

In the air conditioning system 1 according to this embodiment, while the air-conditioning ECU 100 does not receive the allowable signal from the engine ECU 200, the electromagnetic coil 41 of the viscous clutch 7 is set off. Therefore, it is possible to reduce the load of the engine E and to improve the running performance and the driveability of the vehicle.

Figure 9:
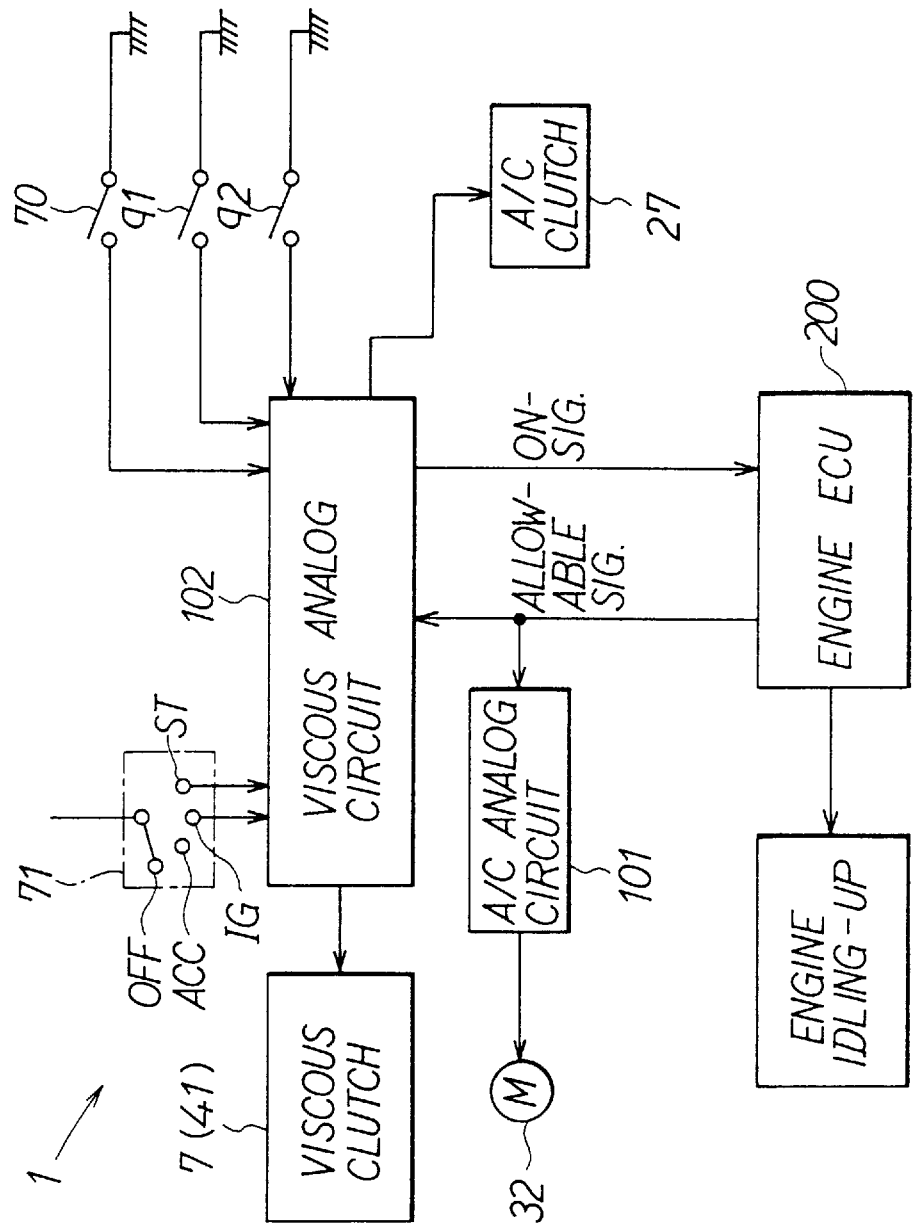
FIG. 9 is a block diagram showing an electric circuit of an air conditioning apparatus for a vehicle according to a second embodiment.
Figure 10:
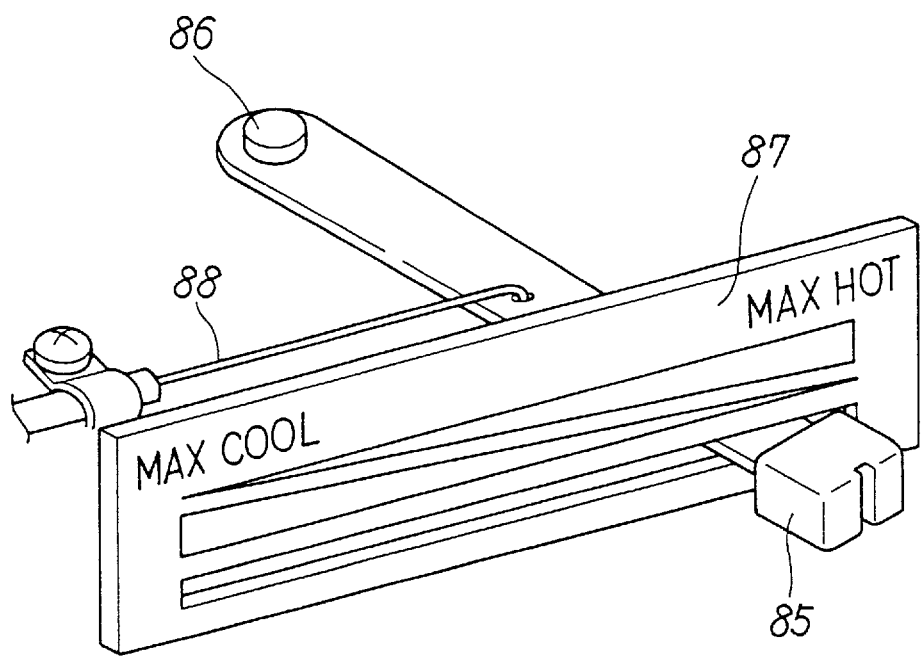
FIG. 10 is a perspective view showing a control panel and a temperature control lever in the second embodiment.

A second embodiment of the present invention will be described with reference to FIGS. 9 and 10. FIG. 9 shows an electric circuit of an air conditioning apparatus for a vehicle, and FIG. 10 shows a control panel and a temperature control lever.

In this embodiment, a manual air conditioning system is employed as the air conditioning apparatus. In the electric circuit of the air conditioning apparatus 1 for a vehicle, instead of the A/C ECU 100, there are provided an air-conditioning analog circuit 101 for performing an analog control on the A/C unit 2 and a viscous analog circuit 102 for performing an analog control on the viscous clutch 7.

To an input portion of the viscous analog circuit 102, there are connected a viscous switch 70, a ST terminal and an IG terminal of the ignition switch 71, a cooling water temperature switch 91, and the engine ECU 200. To an output portion of the viscous analog circuit 102, there are connected the engine ECU 200 and the electromagnetic coil 41 of the viscous clutch 7.

The cooling water temperature switch 91 is opened when the temperature of the cooling water circulating in the cooling water circuit 3 (in this embodiment, the temperature of the cooling water at the outlet-side cooling water pipe 57b of the cooling water passage 51 of the viscous heater 9) is higher than a first predetermined temperature A (e.g., 80° C.) and is closed when the outside air temperature is lower than the first predetermined temperature A or a second predetermined temperature B (e.g., 70°–75° C.).

A touch sensor 92 is disposed within a range where the temperature control lever 85 can move. When the opening degree (actual opening degree) of the water valve 16 is larger than the set damper opening degree (e.g., 70–80%), and the opening degree (actual opening degree) of the air mixing damper 31 is manually operated to be larger than the set damper opening degree (e.g., 15%), i.e., the flow amount of the cooling water circulating in the cooling water passage 51 of the viscous heater 9 is smaller than the set flow amount (e.g., 4 liter/min.), the touch sensor 92 is closed (set ON). When the temperature control lever 85 is in the other positions, the touch sensor 92 is opened (set OFF).

As means for detecting a position of the temperature control lever 85, instead of the touch sensor 92, there may be employed a contact position sensor such as a micro-switch and a limit switch, a non-contact position sensor such as a proximity switch and a photo-electric switch, or a displacement sensor.

The temperature control lever 9 is disposed rotatably with a support shaft 86 as a center thereof on a control panel 87 to move within a range between MAX■COO1 and MAX■HOT. The temperature control lever 85 directly actuates the water valve 16 and the air mixing damper 31 through a wire cable 88 or one or plural link plate(s).

Further, when receiving an ON signal transmitted in a case where the viscous analog circuit 102 determines that the viscous clutch 7 is set on, the engine ECU 200 performs a calculation or determination based on the rotational speed of the engine E, the vehicle speed, the throttle opening, or the cooling water temperature and outputs to the viscous analog circuit 102 an allowable signal or unallowable signal for allowing the air-conditioning unit 2 or the viscous heater 9 to be or not to be turned on.

In this embodiment, even if both of the viscous switch 70 and the cooling water temperature switch 91 are set on (closed), and further the allowable signal is received from the engine ECU 200, at a time when the temperature control lever 85 is operated from the MAX■HOT to the MAX■COOL to set off (open) the touch switch 92, i.e., at a time when the flow amount of the cooling water circulating in the cooling water passage 51 of the viscous heater 9 becomes smaller than the set flow amount, the electromagnetic coil 41 of the viscous clutch 7 is turned off (opened) by the viscous analog circuit 102. In this way, the effects similar to those in the first embodiment can be obtained.

A third embodiment of the present invention will be described with reference to FIG. 11.

Figure 11:
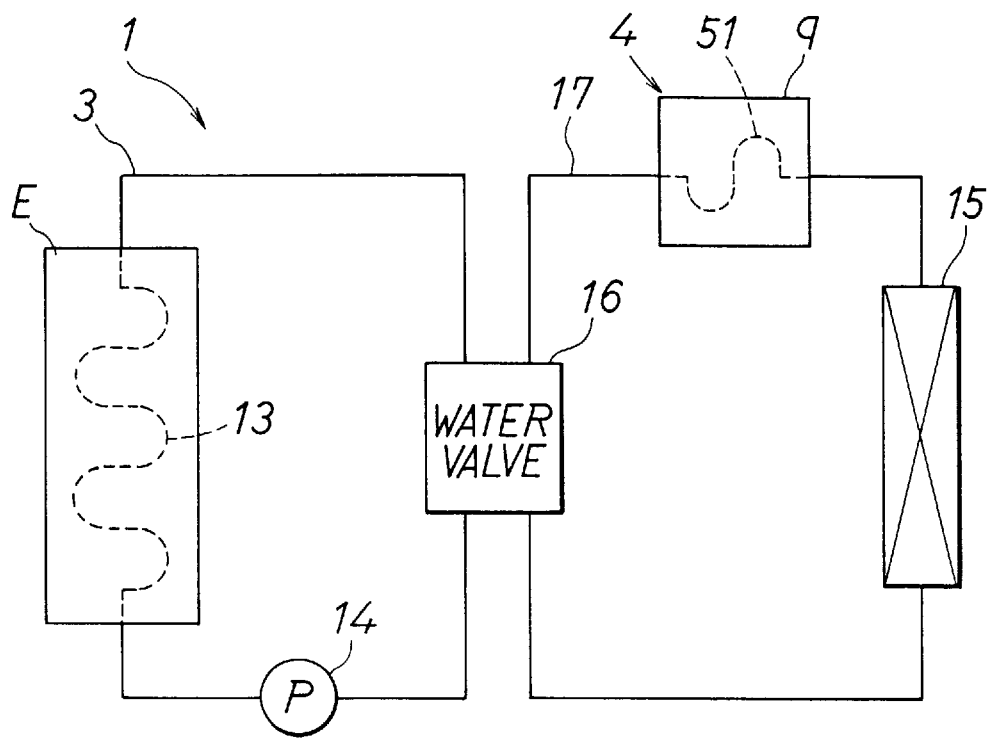
FIG. 11 is a schematic view showing a cooling water circuit according to a third embodiment of the present invention.

FIG. 11 shows a cooling water circuit for connecting an engine to a heater core.

An air conditioning apparatus 1 for a vehicle employs a temperature-adjustment type temperature control system. In this embodiment, a mixing ratio of the cooling water having flowed out of the heater core 15 and the cooling water having flowed out of the water jacket 13 of the engine E is changed by the water valve 16 so that a temperature of the cooling water flowing into the heater core 15 is adjusted. The flow amount of the cooling water circulating into the cooling water passage 51 of the viscous heater 9 is calculated based on an opening degree of the outlet passage 17 at the side of the heater core 15, of the heater core 15. The flow amount of the cooling water circulating into the cooling water passage 51 may be directly measured by a flow meter.

A fourth embodiment of the present invention will be described with reference to FIG. 12.

Figure 12:
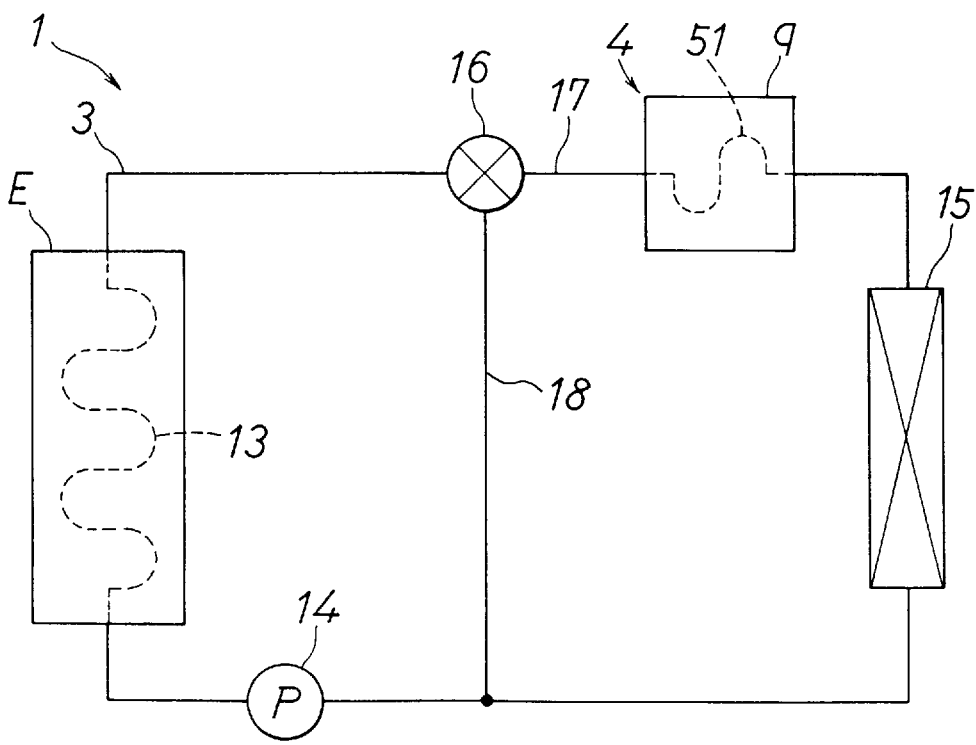
FIG. 12 is a schematic view showing a cooling water circuit according to a fourth embodiment of the present invention.

FIG. 12 shows a cooling water circuit for connecting an engine to a heater core.

An air conditioning apparatus 1 for a vehicle employs a flow amount type temperature control system. In this embodiment, there is provided, in a cooling water circuit 3, a bypass passage 18 for returning the cooling water having flowed out of the water valve 16 to the water jacket 13 of the engine E to bypass the viscous heater 9 and the heater core 15. The water valve 16 adjusts a radiating amount of the heater core 15 by changing the flow amount of the cooling water circulating in the cooling water passage 51 of the viscous heater 9 and the heater core 15. The flow amount of the cooling water circulating in the cooling water passage 51 of the viscous heater 9 is calculated based on an opening degree of the outlet passage 17 at the side of the heater core 15, of the heater core 15. The flow amount of the cooling water circulating into the cooling water passage 51 may be directly measured by a flow meter.

A fifth embodiment of the present invention will be described with reference to FIG. 13.

Figure 13:
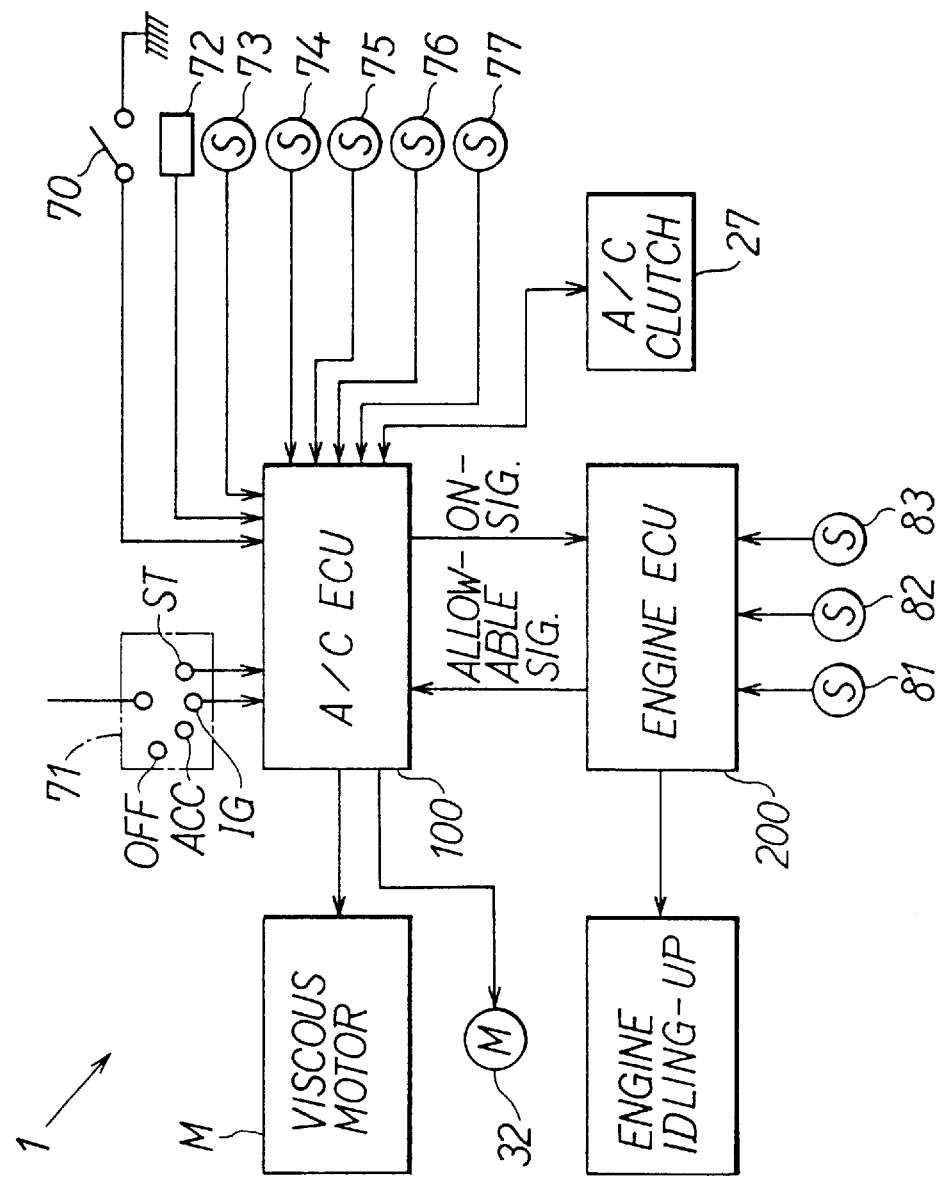
FIG. 13 is a block diagram showing an electric circuit of an air conditioning apparatus for a vehicle according to a fifth embodiment.

FIG. 13 shows an electric circuit of an air conditioning apparatus.

In this embodiment, instead of the engine E (the belt transmitting mechanism 5) as driving source for rotating the shaft 8 of the viscous heater 9 and the rotor 53, an electric motor (hereinafter referred to as viscous motor) M is employed. Further, when the opening degree of the water valve 16 is larger than the set valve opening degree (e.g., 70–80%) (if the heating operation for the passenger compartment is necessary) and the flow amount Q of the cooling water circulating in the cooling water passage 51 of the viscous heater core 9 is smaller than the set flow amount QS (e.g., 4 liter/min.), the electric motor M is turned off, and the rotor 53 is not actuated. Therefore, it is prevented that the viscous fluid is heated abnormally. In this way, the effects similar to those in the first embodiment can be obtained.

A sixth embodiment of the present invention will be described with reference FIG. 14.

FIG. 13 shows an electric circuit of an air conditioning apparatus.

In this embodiment, instead of the engine E (the belt transmitting mechanism 5) as driving source for rotating the shaft 8 of the viscous heater 9 and the rotor 53, a viscous motor M is employed. In this embodiment, similar to the second embodiment, even if both of the viscous switch 70 and the cooling water temperature switch 91 are set on (closed), and further the allowable signal is received from the engine ECU 200, at a time when the temperature control lever 85 is operated from the MAX■HOT to the MAX■COOL to set off (open) the touch switch 92, i.e., at a time when the flow amount of the cooling water circulating in the cooling water passage 51 of the viscous heater 9 becomes smaller than the set flow amount, the viscous motor M is turned off by the viscous analog circuit 102. In this way, the effects similar to those in the second embodiment can be obtained.

In each of the above-described embodiments, the shaft 8 of the viscous heater 9 is driven by connecting the belt transmitting mechanism 5 and the viscous clutch 7 to the output shaft 11 of the engine E; however, the viscous clutch 7 may be connected directly to the output shaft 11 of the engine E to drive the shaft 8 of the viscous heater 9. Further, between the output shaft 11 of the engine E and the viscous clutch 7 or between the viscous clutch 7 and the shaft 8 of the viscous heater 9, there may be connected a transmission mechanism such as a gear transmission having at least one stage gear and a V-belt type non-stage transmission. Further, the viscous clutch 7 may be of a hydraulic multiple disc type clutch or the like.

In each of the above-described embodiments, the V-belt 6 of the belt transmitting mechanism 5 are hung on both of the viscous clutch 7 and the air-conditioning clutch 27; however, the V-belt 6 of the belt transmitting mechanism 5 may be hung on an auxiliary equipment for an engine, such as a hydraulic pump for power steering, a hydraulic pump for supplying hydraulic fluid to the automatic transmission, a hydraulic pump for supplying lubricating oil to the engine E or the transmission, or an alternator for charging a battery mounted on a vehicle, with the viscous clutch 7.

In each of the above-described embodiments, a water-cooled diesel engine is employed as the engine E; however, the other water cooled engine such as a gasoline engine may be employed. The rotor 53 of the viscous heater 9 may be rotated by employing, as the internal combustion engine, the other actuating source such as a water-cooled engine or an air-cooled engine, which is not employed as the heating source for heating.

In each of the above-described embodiments, the present invention is applied to an air-conditioning apparatus for a vehicle, capable of performing a heating operation and a cooling operation for the passenger compartment; however, the present invention may be applied to an air-conditioning apparatus for a vehicle, capable of performing only a heating operation for the passenger compartment.

In each of the above-described embodiments, the cooling water temperature sensor 76 is employed to detect a temperature of the cooling water at the outlet-side cooling water pipe 57b of the cooling water passage 51 of the viscous heater 9; however, there may be employed a cooling water temperature sensor or a cooling water temperature switch for detecting a temperature of the cooling water at an inlet-side of the heater core 15. Further, there may be employed a cooling water temperature sensor or a cooling water temperature switch for detecting a temperature of the cooling water at an inlet-side of the engine E. Still further, the cooling water temperature sensor or the cooling water temperature switch is connected to the engine ECU 200 so that a signal indicative of the cooling water temperature may be read in the engine ECU 100 by a communication.

In each of the first and fifth embodiments, there may be provided, in the A/C ECU 100, control signal detecting means for detecting a control signal output to valve actuating means for actuating the water valve 16. In this way, when the control signal detecting means detects that the control signal output to the valve actuating means is one corresponding to the case where the flow amount of the cooling water circulating in the cooling water passage 51 of the viscous heater 9 corresponds to the set flow amount, the electromagnetic coil 41 of the viscous clutch 7 or the viscous motor M may be turned on.

In each of the second and sixth embodiments, it may be determined that the flow amount of the cooling water circulating in the cooling water passage 5 of the viscous heater 9 is higher than the set flow amount when there is detected a tension of the wire cable 88 where the temperature control lever 85 is operated at the side of MAX■HOT (at the aide where the opening degree of the water valve 16 exceeds the set valve opening degree).

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the present invention as defined in the appended claims.

What is claimed is:

1. A heating apparatus for heating a passenger compartment of a vehicle having a water-cooled internal combustion engine, said heating apparatus comprising:

a heating heat exchanger for heating said passenger compartment by heat-exchanging between cooling water having cooled said water-cooled engine and air to be blown into said passenger compartment;

a heat-generating unit using a shearing force, said heat-generating unit having a rotor which rotates when a rotational driving force of said engine is applied thereto, a heat-generating chamber for sealing therein viscous fluid which generates heat when a shearing force generated by a rotational driving force of said rotor is applied thereto, and a cooling water passage in which the cooling water circulates between said engine and said heating heat exchanger, said heat-generating unit heating the cooling water circulating in said cooling water passage by generated heat of the viscous fluid in said heat-generating chamber;

shearing state switching means for switching a shearing state of the viscous fluid by the rotational driving force of said rotor;

water amount detecting means for detecting an amount of the cooling water flowing into said heat-generating unit; and a heating control unit for controlling said shearing state switching means to stop a shearing force applied to the viscous fluid by the rotational driving force of said rotor when the cooling water amount detected by said water amount detecting means is less than a predetermined value.

2. A heating apparatus according to claim 1, further comprising:

shearing instruction means for giving an instruction for applying a shearing force to the viscous fluid by the rotational driving force of said rotor;

wherein said shearing state switching means is controlled to stop a shearing force applied to the viscous fluid by the rotational driving force of said rotor when the cooling amount detected by said water amount detecting means is less than the predetermined value, irrespective of said instruction by said shearing instruction means.

3. A heating apparatus according to claim 1, wherein said shearing state switching means is a clutch for intermitting a transmission of the rotational driving force from said engine to said rotor.

4. A heating apparatus according to claim 2, further comprising:

a cooling water temperature sensor for detecting a temperature of the cooling water having cooled said engine; wherein, said heating control unit controls said clutch such that:

the rotational driving force is transmitted from said engine to said rotor when the temperature of the cooling water, detected by said cooling water temperature sensor, is less than a set temperature, and the transmission of the rotational driving force from said engine to said rotor is intermitted when the temperature of the cooling water, detected by said cooling water temperature sensor, is more than a set temperature.

5. A heating apparatus according to claim 3, further comprising:

a flow control valve for adjusting an amount of the cooling water circulating into said cooling water passage.

6. A heating apparatus according to claim 5, wherein, said heating control unit includes:

valve opening degree detecting means for detecting an opening degree of said flow control valve; and flow amount calculating means for calculating a flow amount of the cooling water circulating into said cooling water passage, and said heating control unit controls said clutch such that the transmission of the rotational driving force from said engine to said rotor is intermitted when the flow amount of the cooling water, calculated by said flow amount calculating means, is smaller than a set flow amount.

7. A heating apparatus according to claim 5, further comprising:

a control lever, which is operated manually, for controlling an opening degree of said flow control valve;

wherein said water amount detecting means is a position sensor for detecting a position of said control lever.

8. A heating apparatus according to claim 7, further comprising:

an air mixing damper for controlling a ratio of an amount of air to be supplied into said heating heat exchanger and an amount of air bypassing said heating heat exchanger;

wherein said control lever controls an opening degree of said air mixing damper to interlock with the opening degree of said flow control valve.

9. A heating apparatus for heating a passenger compartment of a vehicle having a water-cooled internal combustion engine, said heating apparatus comprising:

a heating heat exchanger for heating said passenger compartment by heat-exchanging between cooling water having cooled said water-cooled engine and air to be blown into said passenger compartment;

a heat-generating unit using a shearing force, said heat-generating unit having a rotor which rotates when a rotational driving force of a driving source is applied thereto, a heat-generating chamber for sealing therein viscous fluid which generates heat when a shearing force generated by a rotational driving force of said rotor is applied thereto, and a cooling water passage in which the cooling water circulates between said engine and said heating heat exchanger, said heat-generating unit heating the cooling water circulating in said cooling water passage by generated heat of the viscous fluid in said heat-generating chamber;

water amount detecting means for detecting an amount of the cooling water flowing into said heat-generating unit; and a heating control unit for controlling said driving source such that said rotor is stopped when the cooling water amount detected by said water amount detecting means is less than a predetermined value.

10. A heating apparatus according to claim 9, further comprising:

a driving force transmission unit for transmitting a rotational driving force of said driving source to said rotor.

11. A heating apparatus according to claim 10, wherein said driving force transmission unit includes:

a belt transmission connected to and driven by said driving source, and a clutch connected to and driven by said belt transmission unit, for engaging and releasing between said belt transmission unit and said rotor.

\* \* \* \* \*

UNITED STATES PATENT AND TRADEMARK OFFICE
CERTIFICATE OF CORRECTION

PATENT NO. : 5,816,495
DATED : October 6, 1998
INVENTOR(S) : Yuji Ito

It is certified that error appears in the above-identified patent and that said Letters Patent is hereby corrected as shown below:

Col. 1, line 6, delete "of"

Col. 1, line 7, delete "are" and substitute --is-- therefor

Col. 2, line 18, delete "is"

Col. 4, line 12, delete "an"

Col. 4, line 22, delete "an" & substitute --a-- therefor

Col. 7, line 2, delete "an" & substitute --a-- therefor

Col. 8, line 32, delete "TE)/(TW-TE)" & substitute --Te)/(Tw-Te)-- therefor

Col. 11, line 3, "on" should be --On--

Col. 12, line 37, delete "COO1" & substitute --COOL-- therefor

Col. 13, lines 8-9, delete "of the heater core 15,"

Col. 13, lines 27-28, delete "of the heater core 15,"

Col. 13, line 50, delete "FIG. 13" & substitute --FIG. 14-- therefor

Col. 15, line 4, delete "aide" & substitute --side-- therefor

Col. 15, line 54, claim 2, after "cooling" insert --water--

Signed and Sealed this

Ninth Day of March, 1999

Attest:

Q. TODD DICKINSON

*Attesting Officer*   Acting Commissioner of Patents and Trademarks